United States Patent [19]

Lohausen

[11] Patent Number: 5,509,321
[45] Date of Patent: Apr. 23, 1996

[54] TOOTHED GEAR

[75] Inventor: Viktor Lohausen, Oberheinriet, Germany

[73] Assignee: Technolizenz Establishment, Liechtenstein

[21] Appl. No.: 277,653

[22] Filed: Jul. 11, 1994

Related U.S. Application Data

[63] Continuation of PCT/EP93/00056, Jan. 12, 1993

[30] Foreign Application Priority Data

Jan. 13, 1992 [CH] Switzerland ................................. 84/92

[51] Int. Cl.⁶ .................................................. F16H 27/02
[52] U.S. Cl. ............................................ 74/89.13; 74/89.15
[58] Field of Search ............................. 74/89.13, 89.15; 135/98, 99, 114, 160

[56] References Cited

U.S. PATENT DOCUMENTS

| | | | |
|---|---|---|---|
| 4,034,621 | 7/1977 | Ritter, Jr. . | |
| 5,214,971 | 6/1993 | Burton et al. | 74/89.13 |
| 5,249,591 | 10/1993 | Gamadi | 135/99 X |
| 5,309,780 | 5/1994 | Schmitt | 74/89.15 X |
| 5,313,852 | 5/1994 | Arena | 74/89.15 |
| 5,355,287 | 10/1994 | Denley | 74/89.15 X |

FOREIGN PATENT DOCUMENTS

| | | |
|---|---|---|
| 2110012 | 9/1972 | Germany . |
| 3806504A1 | 9/1989 | Germany . |
| 1503570 | 7/1981 | United Kingdom . |

*Primary Examiner*—Charles A. Marmor
*Assistant Examiner*—Peter Kwon
*Attorney, Agent, or Firm*—Oliff & Berridge

[57] ABSTRACT

The invention relates to a toothed gear as used in particular for drives of pivoting devices, for example in articulated-arm awnings or windows. One shaft (5) is supported, over a support zone (10), on the other shaft (3), with the result that toothed gears according to the invention are very compact and are stable to blows and impacts.

18 Claims, 1 Drawing Sheet

TOOTHED GEAR

This is a Continuation-in-Part of application Ser. No. PCT/EP93/00056, filed Jan. 12, 1993.

BACKGROUND OF THE INVENTION

1. Field of the Invention

The invention relates to a toothed gear such as is frequently used in drives of a pivoting device in articulated-arm awnings, windows, doors, flaps, adjusting mechanisms for gear or motor controls, and the like.

2. Description of Related Art

It is known that such pivoting devices for articulated-arm awnings are exposed to high stresses due to wind and weather, rain and sunlight, snow and ice. These stresses act on the actual drive as unusually high tensile or compressive forces. Such drives, which are usually in the form of bevel gears, in particular toothed bevel gears, should be stable on the one hand but as compact as possible on the other hand.

A compact arrangement for a pivoting device for articulated-arm awnings having a drive shaft which passes through the mounting tube and an adjusting device, mounted in an open pan, for an adjusting spindle is described, for example, by DE 38 06 504 A 1 of the Applicant.

However, the problem which occurs here is that the powerful tensile or compressive forces acting from the adjusting spindle on the adjusting mechanism itself are usually not so readily absorbed and may lead to faults, for example through excessively large bending moments and jamming of the bevel gear wheels. Moreover, the tensile or compressive forces occuring at the adjusting spindle also act on the bearings and increase the bearing friction.

SUMMARY OF THE INVENTION

It is the object of the invention radically to simplify such adjusting drives or adjusting gears and at the same time to design them, with just as small dimensions, in such a way that the adjusting mechanism can no longer be blocked in the case of excessively large tensile or compressive forces emanating from the adjusting spindle.

Other objects, advantages, and salient features of the invention will become apparent to one skilled in the art from the following detailed description.

The invention is illustrated in detail with reference to an embodiment in conjunction with the attached Figures.

DESCRIPTION OF PREFERRED EMBODIMENTS

Figure 1:
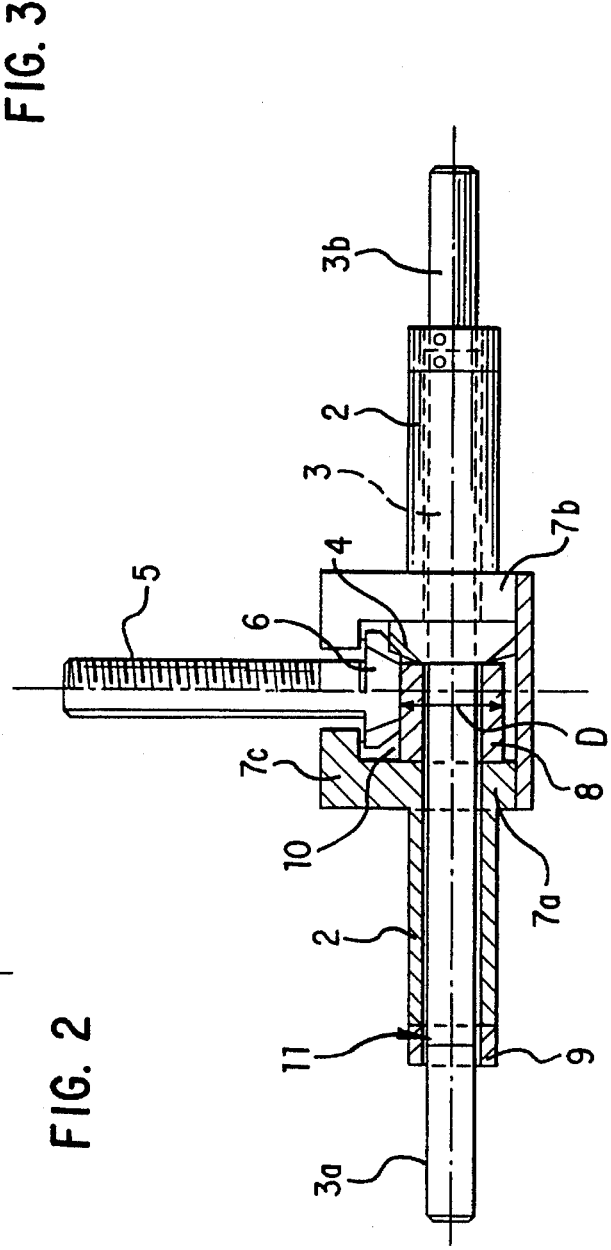
FIG. 1 shows a plan view, partly in section, of the novel gear.

FIG. 1 shows a bevel gear which is arranged in a mounting tube 2. A drive shaft 3 passes through this mounting tube, preferably on both sides. This drive shaft may be in either one or two parts.

A driving bevel gear wheel 4 is arranged on this drive shaft 3. This bevel gear wheel meshes with a further bevel gear wheel 6 which is arranged orthogonally thereto and is connected to an output shaft 5 as an adjusting spindle for a pivoting device.

The bearing block 7 forms the bearing for the drive shaft 3 on the one hand and the bearing for the output shaft 5 on the other hand.

This bevel gear could therefore not absorb excessively large tensile or compressive forces which are transmitted by the adjusting spindle or output shaft 5, i.e. the U-shaped bearing block might warp. A section having a larger diameter D, which for example is integral with the drive shaft 3 or consists of two parts is therefore provided on the drive shaft between the driving bevel gear wheel 4, the driving gear wheel, and the bearing block 7. In any case, a frictional connection is required between the driving bevel gear wheel 4 and the drive shaft 3.

If the drive shaft is produced from two parts, it is advantageous if the driving bevel gear wheel 4 is in the form of a clutch for the two parts of the drive shaft. In particular, this bevel gear wheel could form a part of the section with the larger diameter, to which a corresponding narrower sleeve 8 could then be connected.

Furthermore, it is entirely advantageous within the scope of the invention if the driving bevel gear wheel 4 and the sleeve 8 consist of one piece. It is then possible to use this part as a coupling sleeve for a drive shaft 3 consisting of two parts.

On the other hand, however, it should also be possible to provide the bevel gear wheel, including the sleeve, with a securing device, for example a grub screw or the like, by means of which this part can be fastened to a continuous drive shaft 3.

On the other hand, it may also be advantageous to provide the driving bevel gear wheel 4 with an attachment which serves as a coupling section and may or may not have the increased diameter. In this case, a corresponding shorter sleeve 8 is pushed onto the drive shaft. It is important that the space between driving bevel gear wheel 4 and the bearing block is filled.

On the other hand, it is also possible for the driving bevel gear wheel 4 to be fastened to the drive shaft 3 in such a way that a section serving for coupling projects into the interior, and that the sleeve 8 serves as a coupling sleeve for the drive shaft consisting of two parts.

Finally, it may be advantageous if the drive shaft 3 has a square or similarly noncircular cross-section in the region of the driving bevel gear wheel 4, and the driving bevel gear wheel 4 has a corresponding hole, by means of which the driving bevel gear wheel 4 has a frictional or interlocking connection to the drive shaft.

It is then of course also advantageous and expedient to give the entire drive shaft 3, consisting of one part or of two parts, a noncircular, for example square, cross-section. Sleeve 8 or the coupling sleeve would then have a corresponding hole.

It is important that the entire space between the driving bevel gear wheel 4 and the bearing block 7 is filled in the axial direction of the drive shaft 3 to such an extent that the drive shaft can still be rotated easily but is capable of resisting warping caused by tensile or compressive forces. Jamming of the two bevel gear wheels of the bevel gear is thus avoided in every case.

It is also clear that, in this design, the construction height is kept very small and the bearing block 7 projects only in the direction of the output shaft 5, i.e. the adjusting spindle.

Figure 3:
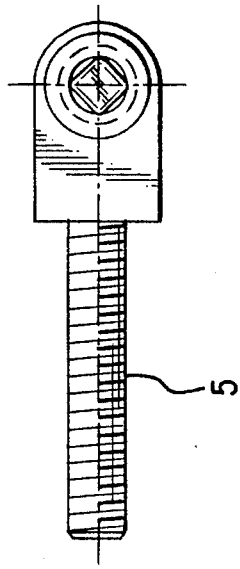
FIG. 3 shows a side view.
Figure 2:
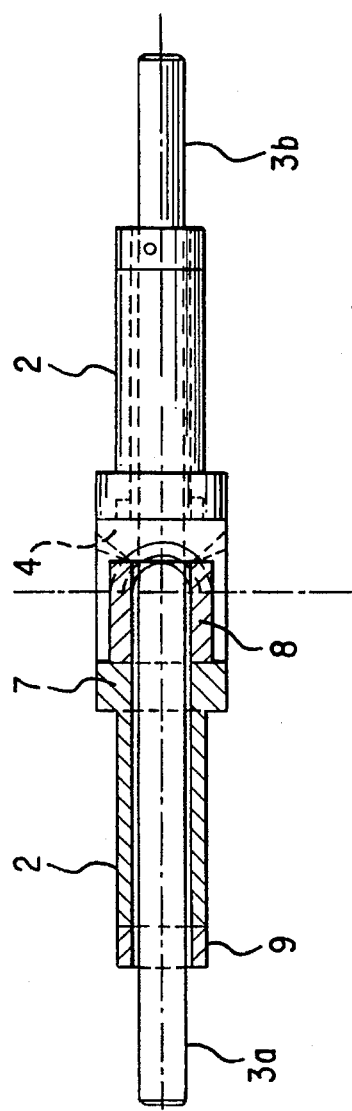
FIG. 2 shows a view from the back.

FIGS. 2 and 3 show corresponding views and are, where required, provided with the same reference symbols and demand no further explanation.

Finally, FIG. 3 shows that the drive shaft has a quadratic cross-section at least at the outer end.

In general, the usual problem of tilting or jamming of the drive is prevented by the new design of a bevel gear for the adjusting mechanism of pivoting devices in articulated-arm awnings.

The following reference symbols denote the following parts: 2. Mounting tube; 3. Continuous driving shaft (3a, b); 4. Driving bevel gear wheel; 5. Output shaft; 6. Gear wheel; 7. Bearing block (a, b limbs; c connecting limb, d cover or yoke); 8. Sleeve; 9. Sleeve ring for connection of the shaft; 10. Support zone.

What is claimed is:

1. A toothed gear having a first shaft carrying a first gear wheel, and a second shaft arranged at an angle thereto and carrying at least one second gear wheel, wherein the shafts are mounted in a bearing block, at least the first shaft passing through the bearing block and having a support zone which supports the second shaft, wherein the support zone directly supports the second shaft and serves as an axial pivot bearing for the second shaft and is formed along the axis of the first shaft such that the support zone fills a space between the first gear wheel and the bearing block so that the first shaft can still be easily rotated but is capable of resisting warping caused by tensile or compressive forces.

2. A toothed gear as claimed in claim 1, wherein the first shaft is a continuous shaft and the supported second shaft is an output shaft, the support zone being arranged between the first gear wheel and a bearing of the drive shaft in the bearing block.

3. A toothed gear as claimed in claim 2, wherein the support zone is supported by the bearing of the first shaft on the bearing block and by the first gear wheel and the support zone supports the second gear wheel.

4. A toothed gear as claimed in claim 1, wherein the bearing block has at least two limbs positioned opposite one another, on which the first shaft is mounted, the second shaft being mounted on a connecting limb interconnecting the at least two limbs.

5. A toothed gear as claimed in claim 1, wherein the first shaft is rotatably mounted at least on one side of the bearing block in a mounting tube which is connected to the bearing block.

6. A toothed gear as claimed in claim 1, wherein the support zone is formed by a sleeve which surrounds the first shaft and is supported on both sides.

7. A toothed gear as claimed in claim 5, wherein the first shaft is one piece and the first gear wheel is fixed axially and detachably to the first shaft, said first shaft having, on the side of the mounting tube, at least one sleeve ring for detachably connecting the shaft to at least one shaft extension.

8. A toothed gear as claimed in claim 6, wherein at least one of the first gear wheel and the sleeve is in the form of a coupling sleeve, and the drive shaft consists of at least two parts which are connected to each other by the coupling sleeve.

9. A toothed gear as claimed in claim 6, wherein the first gear wheel is formed as a single piece together with the sleeve.

10. A toothed gear as claimed in claim 1, wherein the first gear wheel is fixed on the first shaft such that a concentric coupling zone projects into an interior of the bearing block.

11. A toothed gear as claimed in claim 1, wherein three meshing gear wheels which form a differential are provided.

12. A toothed gear as claimed in claim 1, wherein at least one of the first and second shafts includes more than one part.

13. A toothed gear as claimed in claim 5, wherein the mounting tube is formed as a single piece with the bearing block.

14. A toothed gear as claimed in claim 6, wherein the sleeve is a non-rotating sleeve.

15. A toothed gear as claimed in claim 6, wherein the sleeve is a two-part sleeve.

16. A toothed gear as claimed in claim 6 wherein the sleeve is a rotatable two-part sleeve.

17. A toothed gear as claimed in claim 6, wherein at least a lateral surface of said sleeve is coated with a coating which includes "TEFLON".

18. A toothed gear as claimed in claim 6, wherein the first shaft includes two parts and the first gear wheel is fixed on the first shaft such that the sleeve forms a coupling sleeve for coupling the two parts of the first shaft.

* * * * *